US012138204B2

(12) United States Patent
Bianchi et al.

(10) Patent No.: US 12,138,204 B2
(45) Date of Patent: Nov. 12, 2024

(54) SUPPORT DEVICE IN FORM OF A PAD, MAINLY FOR USE ONTO A MEDICAL BED

(71) Applicant: AB MEDICA S.P.A., Milan (IT)

(72) Inventors: Carlambrogio Bianchi, Milan (IT); Diego Casati, Milan (IT); Cristiano Bettinelli, Milan (IT)

(73) Assignee: AB MEDICA S.P.A., Milano Mi (IT)

( * ) Notice: Subject to any disclaimer, the term of this patent is extended or adjusted under 35 U.S.C. 154(b) by 152 days.

(21) Appl. No.: 17/906,041

(22) PCT Filed: Oct. 15, 2021

(86) PCT No.: PCT/IB2021/059511
§ 371 (c)(1),
(2) Date: Sep. 9, 2022

(87) PCT Pub. No.: WO2022/084815
PCT Pub. Date: Apr. 28, 2022

(65) Prior Publication Data

US 2023/0026351 A1 Jan. 26, 2023

(30) Foreign Application Priority Data

Oct. 19, 2020 (IT) ........................ 102020000024568

(51) Int. Cl.
*A61G 13/12* (2006.01)
*A61G 13/00* (2006.01)

(52) U.S. Cl.
CPC ....... *A61G 13/126* (2013.01); *A61G 13/0009* (2013.01)

(58) Field of Classification Search
CPC .. A61G 13/126; A61G 13/0009; A61G 1/044; A61G 13/12; A61G 13/1225; A61G 13/122
See application file for complete search history.

(56) References Cited

U.S. PATENT DOCUMENTS 5,865,780 A * 2/1999 Tuite ....................... A61F 5/058 5/628
8,601,623 B1 * 12/2013 West .................... A61G 13/122 5/628
10,285,890 B1 5/2019 Pigazzi et al.
(Continued)

OTHER PUBLICATIONS

International Search Report and Written Opinion for Corresponding International Application No. PCT/IB2021/059511, 10 pages, Feb. 4, 2022.

*Primary Examiner* — Fredrick C Conley
(74) *Attorney, Agent, or Firm* — LUCAS & MERCANTI, LLP

(57) ABSTRACT

A support device for use on a fixed or mobile medical bed is disclosed. The device includes:

a mattress element, configured to receive on it the body of a subject in a lying position and for this purpose presenting a flat conformation with a longitudinal dimension (L) prevalent with respect to a transversal dimension (T);

fixing means of the mattress element to the support structure, arranged in correspondence with a portion of the longitudinal margin of said mattress element and connected or connectable to the latter. The fixing means have a continuously or discreetly adjustable position (P) along the longitudinal margin portion of the mattress element.

13 Claims, 3 Drawing Sheets

(56) References Cited

U.S. PATENT DOCUMENTS

| | | | | |
|---|---|---|---|---|
| 2013/0205495 | A1* | 8/2013 | Ponsi | A61G 7/10<br>5/81.1 HS |
| 2014/0366271 | A1* | 12/2014 | Marshall | A61F 5/3776<br>5/652 |
| 2017/0189255 | A1 | 7/2017 | Holladay | |
| 2018/0140457 | A1* | 5/2018 | Sarma | A61G 13/1235 |

* cited by examiner

SUPPORT DEVICE IN FORM OF A PAD, MAINLY FOR USE ONTO A MEDICAL BED

CROSS-REFERENCE TO RELATED APPLICATIONS

This application is a 371 of PCT/IB2021/059511, filed Oct. 15, 2021, which claims the benefit of Italian Patent Application No. 102020000024568, filed Oct. 19, 2020.

TECHNICAL FIELD OF THE INVENTION

The present invention relates to a support device, in particular substantially in the form of a mattress, mainly for use on a support structure in the form, for example, of a medical bed. The device is of the type having elements for connecting and locking to the support structure, for example in the form of a strap, strip or band.

BACKGROUND

Many support devices in the form of a mattress are known in the art, which are typically arranged on an operating table, or on a different support structure, for example during a surgery.

Such devices typically provide a deformable main body, precisely in the form of a mattress, which is fixed to the operating table by means of strips or bands equipped with straps or Velcro® couplings at the ends. These fasteners are necessary to avoid a relative displacement between the mattress and the operating table during the setting up of the operating environment and during the related surgical procedure, in order to ensure the accuracy of the latter. In addition, in the case of interventions that involve an inclination of the bed for better access to the body areas of interest, these fixing elements help to ensure the absence of slipping between the mattress/patient and the surgical bed and therefore the safety of the patient.

Despite their wide use, the known support devices are still perfectible, above all in relation to the versatility of use on different operating tables or in different application conditions.

Another essential requirement to which an improvement solution can be provided is the simplicity of connection to the operating table or to a support structure in general.

U.S. Pat. No. 10,285,890B1 discloses a support device in the form of a pad which includes continuous transverse bands extending from side to side of the pad itself. At their ends, these bands incorporate elements for attachment to the operating table. The transverse bands can be connected to the main body of the mat by means of ring and hook coupling means.

SUMMARY OF THE INVENTION

The technical problem posed and solved by the present invention is therefore that of providing a support device which allows to overcome one or more of the drawbacks mentioned above with reference to the known art.

This problem is solved by a device according to claim 1.

Preferred features of the present invention are the subject of the dependent claims.

According to a preferred embodiment of the invention, the support device comprises the two main components listed below, which can be provided structurally distinct or integrated or connected to each other.

A mattress element, or pad, configured to receive the body of a subject, typically a patient, in a fully or partially extended (prone or supine) position on it. To this end, this element generally has a flat and elongated shape in a longitudinal direction of a prevalent dimension with respect to the dimension in a transverse direction, both being widely greater than the thickness of the element itself.

Fixing means to a support structure underlying the mattress element, typically an operating table or a transport stretcher, which fixing means generally include bands, strips or in any case oblong elements. Said fixing means are generally provided bilaterally, in correspondence with each of the transversely opposite longitudinal margin portions of the mat, and are connected or connectable to said portions.

According to an aspect of the invention, the fixing means have an adjustable longitudinal position, continuously or discreetly, along one or both of said longitudinal margin portions of the mattress element.

In this way, the device is extremely versatile with respect to different applications and different support structures.

Advantageously, the mattress element can be configured to prevent the subject from slipping, even in longitudinally and/or transversely inclined positions typical of some surgical procedures, for example of the gynecological type.

In addition, the mattress element can exhibit a viscoelastic behavior to effect a more uniform distribution of loads on the subject, avoiding concentrated stresses due to the prolonged stay in contact with the support structure which could cause damage to the skin.

Advantageously, the mattress element can be made, at least in part, of an open cell expanded polymer, which allows the skin of the person lying on it to breathe, avoiding localized irritation.

Preferably, the mattress element is made entirely or partially in Polyurethane (PU), in particular expanded polyurethane, or in a material with similar physical-mechanical characteristics.

In preferred embodiments, the mattress element has biocompatibility properties and/or is fireproof.

According to an aspect of the invention, the support device comprises one or a pair of elements for adjusting said longitudinal position of the fixing means. Each adjustment element is in the form of an oblong longitudinal element that can be associated with the mattress element in correspondence with a respective portion of the longitudinal margin of the latter. In preferred embodiments, each adjustment element is in the form of a strip or band, or even of a sled, rail or guide element, fixed or fixable to the mattress element at said respective portion of its longitudinal margin.

One or each adjustment element can be coupled with the respective fixing means for example by means of Velcro® elements, engagement of one or more pins or brackets in slots, sliding coupling of one or more pins in a guide or rail or similar methods.

Advantageously, the provision of the adjustment elements allows an independent control of the longitudinal position of the fixing means arranged at opposite transverse ends of the mattress element.

In one embodiment, each adjustment element consists of an elastic material, preferably having a stiffness of the same order of magnitude as that of the mattress element, with a difference of 20%.

Preferably, each adjustment element is made, completely or in part, of fabric, for example based on natural and/or synthetic fibers. In variant embodiments, each element has a coating, for example made of polymeric material such as Polyurethane, Polyvinyl chloride, Polyamide or the like. Other solutions can consist, for example, in a coupled Polyester/Polyurethane foam/Polyester, or in a simple sheet of polymeric material.

In one embodiment, each adjustment element is bound to the mattress element by means of a continuous junction area, arranged over the entire longitudinal extension of a long edge of the mattress element itself. In this way the position adjustment can be allowed along the entire longitudinal portion concerned.

This constraint, or mechanical connection, can be achieved by one or more of the following techniques: bonding, in particular with adhesive; welding, for example by ultrasound or heat sealing; melting using solvents; seam.

In specific embodiments, each adjustment element is, as mentioned, in the form of a strip or band, advantageously with a substantially rectangular or quadrangular plan, for example with a width of 50 mm.

The adjustment elements can also be fireproof.

As mentioned, the fixing means typically comprise strips or bands at both longitudinal sides of the mattress element, preferably two or three per side.

Preferably, the fixing means also include hooking elements, for example in the form of velcro, buckle, clip and/or button, provided at its distal end from the mattress element and configured for locking on the support structure.

The fixing means can be made of the same materials and structures already mentioned in relation to the adjustment elements.

It is also possible, for example, to use a non-woven fabric (TNT) belt.

The fixing means can also be fireproof.

In embodiments, which can be used synergistically or independently of the other aspects of the invention mentioned above, the fixing means can also be made of a material having an elastic modulus of the same order of magnitude as the mattress element, which helps to distribute the forces between the latter and the adjustment elements.

In a first preferred configuration, the main components mentioned above (mattress, fixing elements and adjustment elements) are supplied already mechanically connected to each other.

In an alternative configuration, they can be supplied mechanically separated from each other or only partially connected. For example, the adjustment elements can already be connected, in a reversible/adjustable way, to the fixing means, but not to the mattress element. Advantageously, in this case the adjustment elements can be prepared with a pre-applied adhesive layer protected by a removable covering, or liner, to be mechanically connected to the mattress at the time of use.

In this configuration, therefore, the device is supplied in the form of a kit.

In one embodiment, the device can comprise one or more pressure sensors or transducers, which, on the basis of the measured values, can transmit the detected data to a local or remote acquisition and/or control unit. Transmission can take place wirelessly (for example via Bluetooth and/or WiFi). These data, suitably processed, can provide a signal to operators regarding any critical areas, in order to act accordingly for the (re) positioning of the patient.

In a further variant, on the basis of the processing of the acquired data, commands (possibly arranged automatically) can be sent to a second device, arranged under the first, which selectively activates compensatory measures. For example, the second device could be divided into inflatable sectors, which can also be activated separately from each other, to optimally redistribute the loads, thus avoiding the physical intervention of the operator.

The aforementioned sensors or transducers can be integrated into one or more of the components of the device introduced above or applied to the surface of this/these, for example printed on one face of the mattress element.

Also or only detectors other than pressure sensors or transducers may be provided, for example suitable for measuring any vital parameter such as for example ECG, pulse, heart rate, respiratory rate and temperature.

Other advantages, characteristics and methods of use of the present invention will become evident from the following detailed description of some embodiments, presented by way of example and not of limitation.

BRIEF DESCRIPTION OF FIGURES

Reference will be made to the figures of the attached drawings, in which.

In the figures introduced above, the dimensions are intended as purely illustrative and not necessarily with components shown in proportion.

DETAILED DESCRIPTION OF PREFERRED EMBODIMENTS

The following will describe different embodiments and variants of the invention and its parts, based on different aspects of it that can be used separately or in combination and this with reference to the figures introduced above.

Similar components are denoted in the various figures with the same or corresponding numerical reference. In particular, in the embodiments of FIGS. 2, 2A and 3, 3A, 3B numerical references corresponding to those of the embodiment of FIG. 1, with numbering starting from 100 and 200, respectively, are used.

In the detailed description that follows, further embodiments and variants with respect to embodiments and variants already treated in the same description will be illustrated limitedly to the differences with what has already been disclosed.

Furthermore, as mentioned, the various embodiments and variants described below are capable of being used in combination, where compatible.

Figure 1:
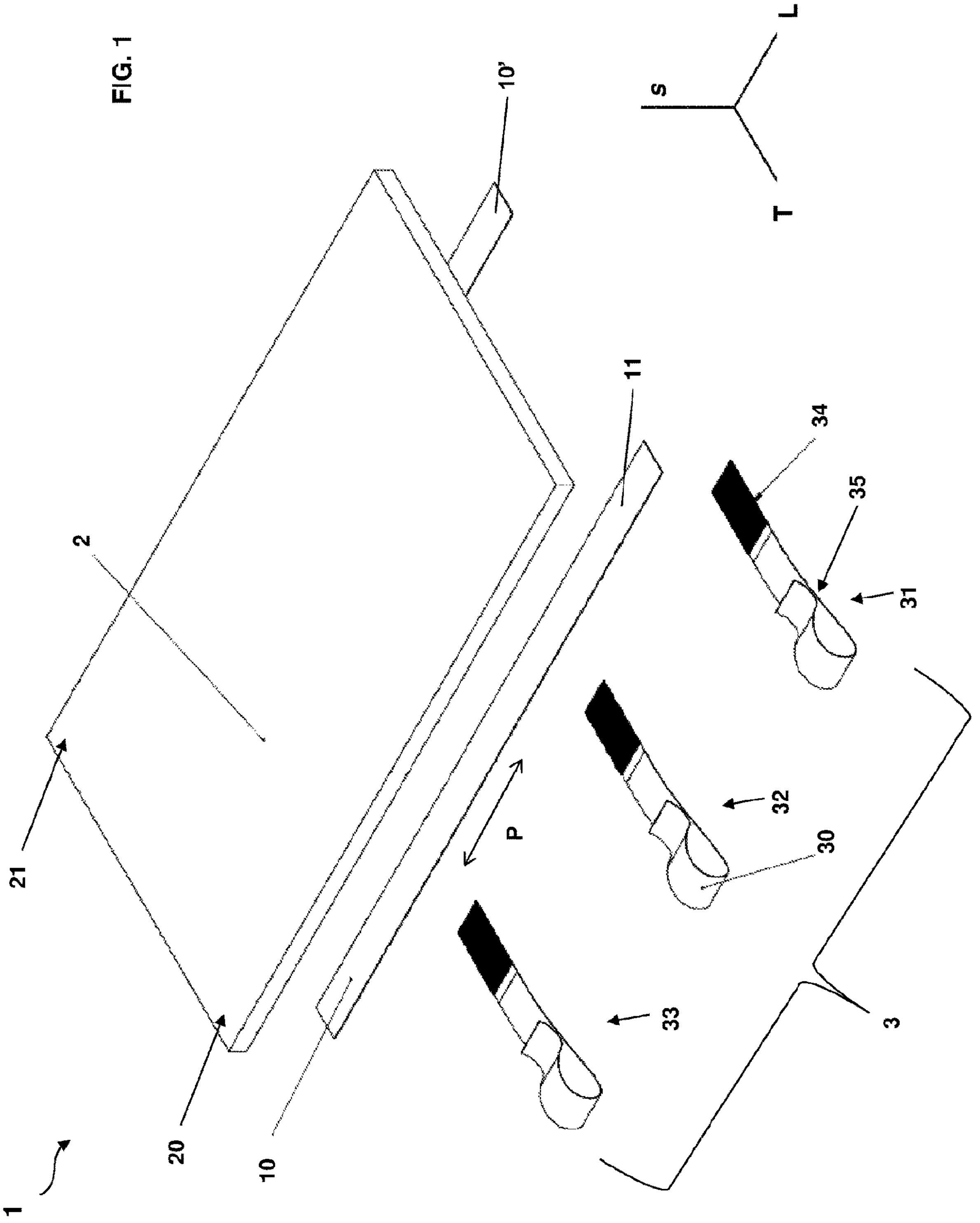
FIG. 1 refers to a first embodiment of a support device according to the invention, showing an exploded perspective view thereof.

With reference initially to FIG. 1, a support device according to a first preferred embodiment of the invention is generally denoted with 1.

The support device 1 is intended mainly for use on a support structure, in particular a fixed or mobile medical bed, subjected to the device itself.

The support device 1 comprises a mattress element, or pad, 2, configured to receive the body of a subject in a lying position on it. To this end, the mattress element 2 generally has a planar or flat conformation, in particular quadrangular, with a longitudinal dimension in the L direction prevalent with respect to a dimension in the transverse direction T, and both prevailing with respect to the thickness in the s direction.

In preferred embodiments, the mattress element 2 is configured to support the subject, preventing it from slipping even when placed in longitudinally and/or transversely inclined postures.

The mattress element 2 advantageously has a viscoelastic behavior to effect a more uniform distribution of loads on the patient, avoiding concentrated stresses.

Preferably, the mattress element is made entirely in part in Polyurethane (PU), in particular expanded polyurethane, or in a material with similar mechanical characteristics of elasticity and/or deformability.

The support device 1 also comprises fixing means 3 of the mattress element 2 to the support structure. In the present example, these fixing means 3 comprise a plurality of oblong fixing elements, each preferably in the form of a strip, band or strap, arranged bilaterally at a first and a second longitudinal margin portion of the mattress element 2, the latter denoted respectively with 20 and 21. For simplicity, in FIG. 1 only three fixing elements are represented, denoted respectively with 31, 32 and 33, associated with the first portion of the longitudinal margin 20 of the mattress element 2.

In some embodiments, each fixing element 31, 32, 33 has stiffness of the same order of magnitude, in particular with a percentage difference ≤20%, of the mattress element 2 and/or of the longitudinal margin portions 20, 21 of this 'last.

Each fixing element introduced above, for example the element denoted by 31, has a first portion 34 equipped with first coupling elements, for example of the Velcro® type, also denoted by 34. This first portion 34 is arranged, in use, proximal to the mattress element 2. A second portion 35 of the fixing element 31, integral and/or united with the first portion 34, is disposed, in use, in a distal position with respect to the mattress element 2 and it is equipped with its own further first and second coupling means, for example of the Velcro® type, so as to be able to fold back on itself forming a ring or loop 30 for locking with a bar or other component of the support structure.

The support device 1 then comprises a first and a second element for adjusting the longitudinal position of the fixing elements 3 introduced above, denoted respectively by 10 and 10' and each arranged in correspondence with a respective portion of the longitudinal margin 20, 21 of the mattress element 2. Each adjustment element 10, 10' is substantially configured in the form of a strip or longitudinal band.

Each adjustment element 10, 10' is arranged, in use, interposed between the mattress element 2 and the fixing means 3 to connect one to the other. To this end, each adjustment element 10, 10' carries second coupling means 11, for example of the Velcro® type, complementary to those provided on the portion 34 of the fixing element 31, 32 and/or 33. In this way, it is possible to connect each of the fixing elements, for example the one denoted by 31, in any longitudinal position, or coordinate, P along the adjustment element 10. A continuous step position adjustment of the aforesaid position is therefore allowed.

Each adjustment element 10, 10' is connected to the respective portion of the longitudinal margin 20, 21 of the mattress element 2 preferably at a lower face of the element 2 itself. In particular, each adjustment element can be completely or partially superimposed transversely to the mattress element 2, in the second case protruding laterally towards the outside with respect to it.

In one embodiment, each adjustment element 10, 10' has stiffness of the same order of magnitude, in particular with a percentage difference 20%, of the mattress element 2 and/or of the longitudinal margin portions 20, 21 of this' last.

Each fixing element 31, 32, 33 can have, in cross section, a multilayer structure, in particular a sandwich structure, which comprises an intermediate layer of polyurethane foam and two external layers of polyester.

The same structure can also be provided for each of the adjustment elements 10 and 10'.

Figures 2, 2A:
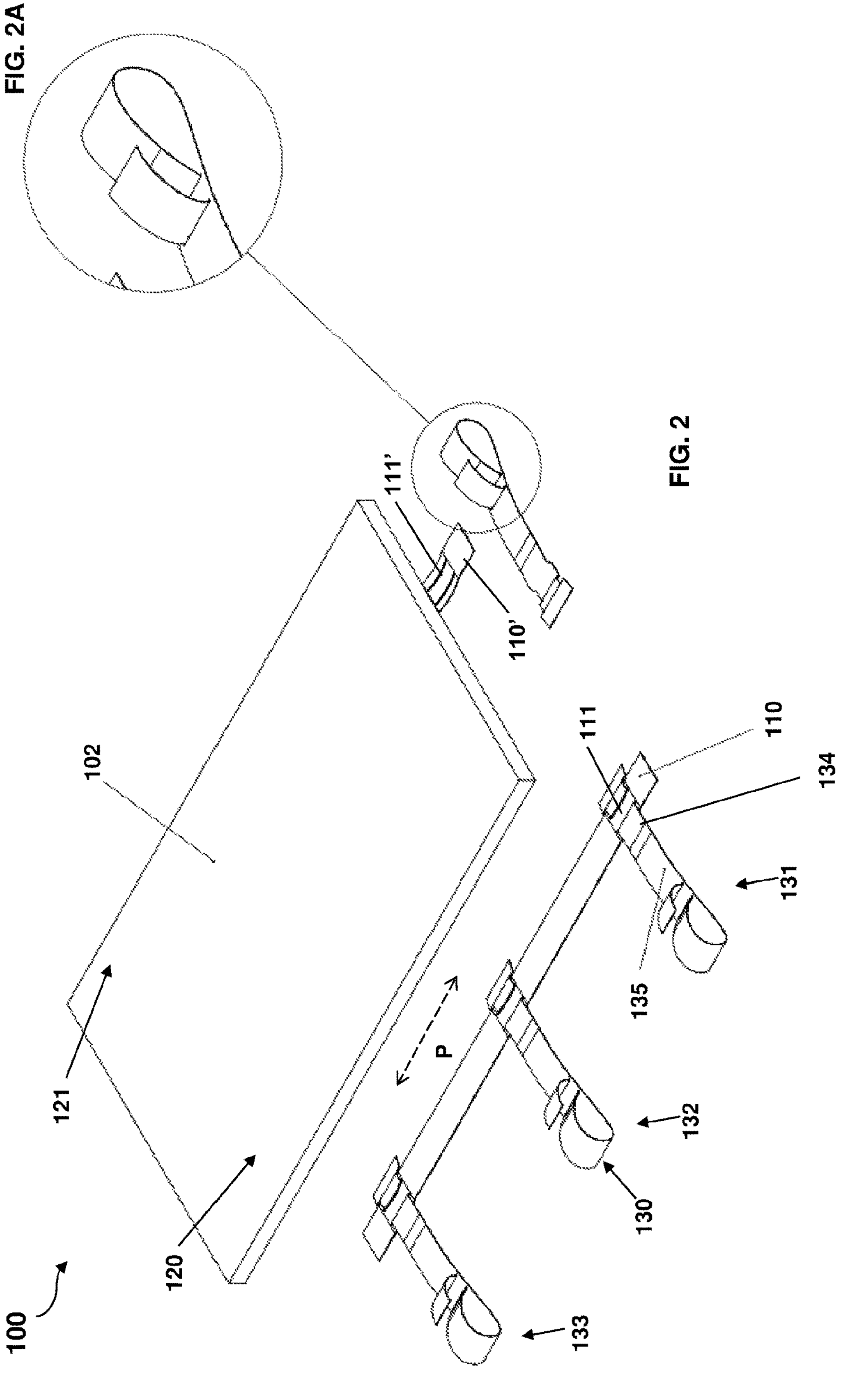
FIGS. 2 e 2A refer to a support device according to another embodiment of the invention, showing respectively an exploded perspective view and an enlarged detail of the latter.

FIGS. 2 and 2A refer to a second embodiment of the support device of the invention, here globally denoted with 100. As mentioned, only the components different from those of the first embodiment and related variants illustrated above will be described. The components are denoted with numerical references corresponding to those of FIG. 1, in this case on the basis of numbering starting from 100.

In the present embodiment, the coupling between adjustment elements, here denoted by 110 and 110', and fixing elements, some of which denoted by 131, 132 and 133, is obtained in discrete positions, by means of a reversible coupling between a proximal bracket portion 134 of each fixing element and any slot 111, 111' of a plurality formed in the adjustment element 110, 110'. In FIG. 2, all the slots 111 of the adjustment element 110 are represented as being engaged by a corresponding fixing element 131, 132, 133, while it is understood that the position of a plurality of slots 111 along the element 110 allows a choice of the discrete position P, more suitable for fixing elements with fewer than the same slots.

The distal portion 135 of each fixing element also has a slot configuration to allow fixing to the support structure by means of a loop or ring 130.

Figures 3, 3A, 3B:
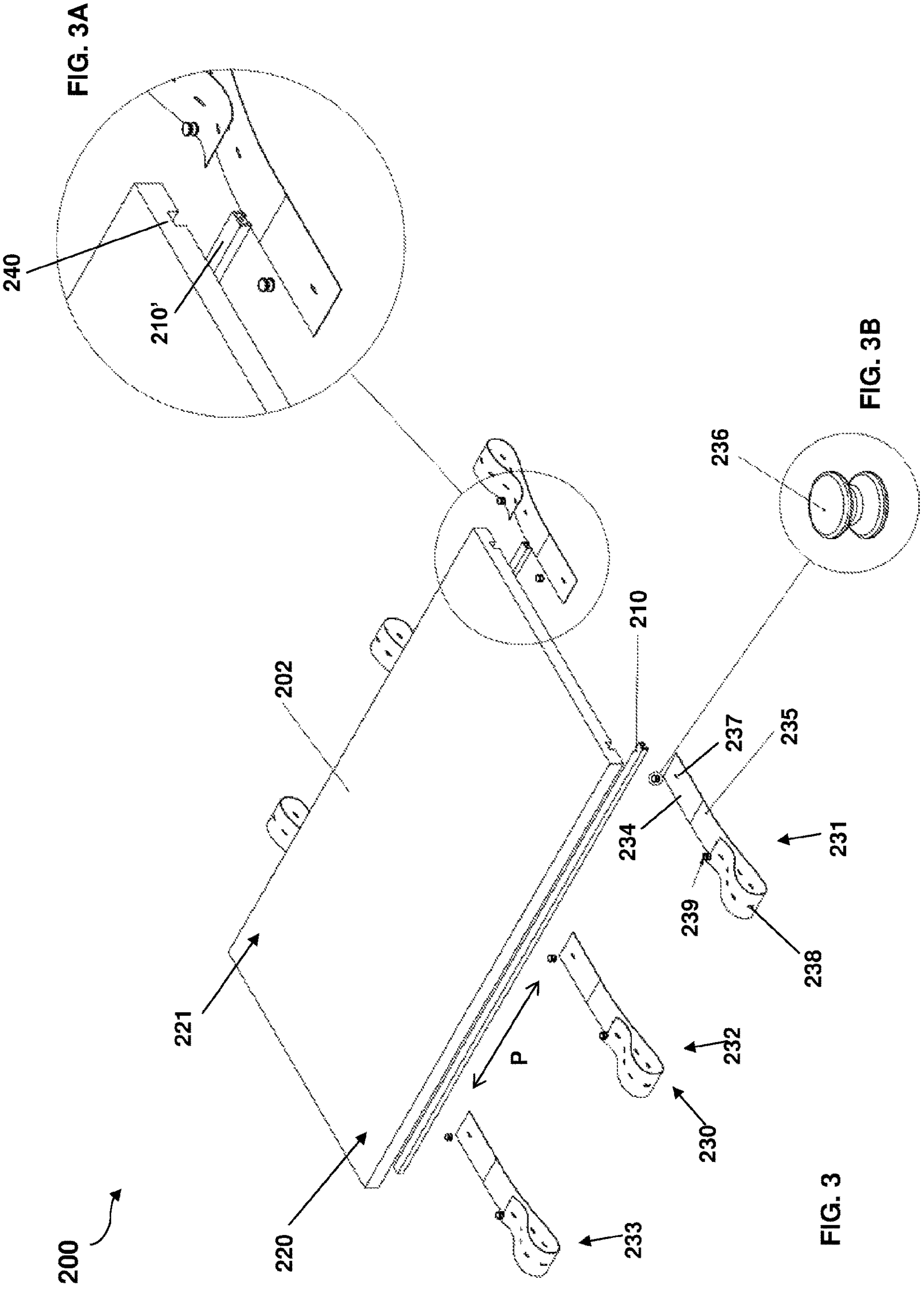
FIGS. 3, 3A e 3B refer to a support device according to a further embodiment of the invention, showing respectively an exploded perspective view and a first and second enlarged detail of the latter.

FIGS. 3, 3A and 3B refer to a third preferred embodiment of the support device of the invention, here globally denoted by 200. As mentioned, only the components different from those of the first embodiment and relative variants will be described. illustrated above. Also in this case, the components are denoted with numerical references corresponding to those of FIG. 1, on the basis of numbering starting from 200.

In the present embodiment, the adjustment elements, denoted here with 210 and 210', consist or include a slide, guide or rail having a substantially inverted "U" or "C" section, or a prismatic conformation with an open side for sliding engagement by one or more pins 236.

Each guide 210, 210' can be received in a special longitudinal seat, or cavity 240 of the mattress element 202.

Each pin 236 is associated with a fixing element, denoted for example with 231, 232 or 233. Each pin 236 is received, in a removable or fixed way, within a seat, in particular through, 237, obtained in correspondence with a proximal portion 234 of the respective fixing element, for example the one denoted by 231.

The coupling described allows a continuous adjustment of the longitudinal position P of each fixing element.

The distal portion 235 of each fixing element also bears a construction with multiple slots 238, with a pin 239 receivable in pairs of slots obtained by folding said portion 235 on itself so as to form a ring or loop 230. Also in this case, the pin 239 can be permanently locked in one of the slots or removably received therein. The arrangement of multiple slots, in particular in a number greater than two, on the end portion 235 of each fixing element allows an adjustment of the width of the ring or loop 230.

The present invention has been described up to now with reference to preferred embodiments. It is to be understood that there may be other embodiments that pertain to the same inventive core, as defined by the scope of the claims set out below.

The invention claimed is:

1. A support device for supporting a body on a medical bed, the support device comprising:
- a mattress element, configured to receive a body of a subject in a lying position, the mattress element having a longitudinal dimension and a transversal dimension;
- a first adjustment element connected to a first portion of the mattress element proximate a first edge of the mattress element, wherein the first adjustment element comprises one of a strip, a longitudinal band, a slide element, a rail, or a longitudinal guide;
- a second adjustment element connected to a second portion of the mattress element proximate a second edge of the mattress element, wherein the second adjustment element comprises one of a strip, a longitudinal band, a slide element, a rail, or a longitudinal guide;
- one or more first fixing elements, each first fixing element having a respective first connecting element configured to connect the respective first fixing element to the first adjustment element at a respective first continuously adjustable location on the first adjustment element, and a respective first coupling element configured to connect the respective first fixing element to a support structure associated with a medical bed; and
- one or more second fixing elements, each second fixing element having a respective second connecting element configured to connect the respective second fixing element to the second adjustment element at a respective second continuously adjustable location on the second adjustment element, and a respective second coupling element configured to connect the respective second fixing element to the support structure associated with the medical bed.

2. The support device according to claim 1, wherein each in the form each of the one or more first fixing elements comprises one of a band or a strip and each of the one or more second fixing elements comprises one of a band or a strip.

3. The support device according to claim 1, wherein;
- the respective first connecting element of each first fixing element comprises a first hook-and-loop fastener adapted to connect to the first adjustment element; and
- the respective second connecting element of each second fixing element comprises a second hook-and-loop fastener adapted to connect to the second adjustment element.

4. The support device according to claim 1, wherein;
- the first adjustment element comprises one or more first slots configured to receive the first fixing elements and each first fixing element comprises a first bracket portion configured to pass through a corresponding first slot; and
- the second adjustment element comprises one or more second slots configured to receive the second fixing elements and each second fixing element comprises a second bracket portion configured to pass through a corresponding second slot.

5. The support device according to claim 1, wherein:
- the first adjustment element comprises one of a slide, a rail or a longitudinal guide element, and each first fixing element comprises a first pin configured to slidably engage the first adjustment element; and
- the second adjustment element comprises one of a slide, a rail or a longitudinal guide element, and each second fixing element comprises a second pin configured to slidably engage the second adjustment element.

6. The support device according to claim 1, wherein;
- the first adjustment element extends from the first edge of the mattress element; and
- the second adjustment element extends from the second edge of the mattress element.

7. The support device according to claim 1, wherein:
- the first adjustment element is connected to the mattress element along an entire length of the mattress element; and
- the second adjustment element is connected to the mattress element along the entire length of the mattress element.

8. The support device according to claim 1, wherein; in use, each adjustment element is connected to said mattress element by one or more of the following techniques:
- the first adjustment element is connected to the mattress element by one of: gluing, welding, ultrasound or heat sealing; melting using solvents, or seam; and
- the second adjustment element is connected to the mattress element by one of: gluing, welding, ultrasound or heat sealing; melting using solvents, or seam.

9. The support device according to claim 1, wherein:
- the first coupling element of each first fixing element is configured to form one of a ring or a loop, facilitating a first connection to the support structure; and
- the second coupling element of each second fixing element is configured to form one of a ring or a loop, facilitating a second connection to the support structure.

10. The support device according to claim 1, wherein;
- the first coupling element of each first fixing element comprises one of a hook-and-loop fastener, a slot, a clip, or a button configured facilitate a first connection to the support structure; and
- the second coupling element of each second fixing element comprises one of a hook-and-loop fastener, a slot, a clip, or a button configured facilitate a second connection to the support structure.

11. The support device according to claim 1, wherein;
- the first adjustment element enables a user to adjust a respective first position of each first fixing element on the first adjustment element independently of the other first fixing elements; and
- the second adjustment element enables the user to adjust a respective second position of each second fixing element on the second adjustment element independently of the other second fixing elements.

12. The support device of claim 1, wherein:
- the first adjustment element is connected to the first portion of a lower side of the mattress element proximate the first edge of the lower side of the mattress element; and
- the second adjustment element is connected to the second portion of the lower side of the mattress element proximate the second edge of the lower side of the mattress element.

13. A support device for supporting a body on a medical bed, the support device comprising:
- a mattress element, configured to receive a body of a subject in a lying position;

a first adjustment element connected to a first portion of the mattress element proximate a first edge of the mattress element;

a second adjustment element connected to a second portion of the mattress element proximate a second edge of the mattress element;

one or more first fixing elements, each first fixing element having a respective first connecting element configured to connect the respective first fixing element to the first adjustment element at a respective first adjustable location on the first adjustment element, and a respective first coupling element configured to connect the respective first fixing element to a support structure associated with a medical bed; and one or more second fixing elements, each second fixing element having a respective second connecting element configured to connect the respective second fixing element to the second adjustment element at a respective second adjustable location on the second adjustment element, and a respective second coupling element configured to connect the respective second fixing element to the support structure associated with the medical bed.

* * * * *